United States Patent
Chen et al.

(10) Patent No.: US 12,224,684 B2
(45) Date of Patent: Feb. 11, 2025

(54) OPTICAL ELEMENT DRIVING MECHANISM WITH PIEZOELECTRIC DRIVING ASSEMBLY

(71) Applicant: TDK TAIWAN CORP., Taoyuan (TW)

(72) Inventors: Shu-Shan Chen, Taoyuan (TW); Pai-Jui Cheng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 211 days.

(21) Appl. No.: 17/866,190

(22) Filed: Jul. 15, 2022

(65) Prior Publication Data

US 2023/0275530 A1    Aug. 31, 2023

Related U.S. Application Data

(60) Provisional application No. 63/268,573, filed on Feb. 25, 2022.

(51) Int. Cl.
*H02N 2/12* (2006.01)
*G03B 17/56* (2021.01)
*H02N 2/14* (2006.01)

(52) U.S. Cl.
CPC ............. *H02N 2/12* (2013.01); *G03B 17/561* (2013.01); *H02N 2/14* (2013.01)

(58) Field of Classification Search
CPC . H02N 2/12; H02N 2/14; H02N 2/025; G03B 17/561; G03B 7/00; G03B 7/023; G03B 30/00
See application file for complete search history.

(56) References Cited

U.S. PATENT DOCUMENTS

| | | | |
|---|---|---|---|
| 2007/0229702 A1* | 10/2007 | Shirono | G02B 13/009 348/374 |
| 2019/0136839 A1* | 5/2019 | Miller | F03G 7/06 |
| 2019/0273451 A1* | 9/2019 | Takei | H02P 25/06 |

\* cited by examiner

*Primary Examiner* — Emily P Pham
(74) *Attorney, Agent, or Firm* — MUNCY, GEISSLER, OLDS & LOWE, P.C.

(57) ABSTRACT

An optical element driving mechanism is provided in the present disclosure, including a fixed portion, a movable portion that is connected to an optical assembly, and a driving assembly that drives the movable portion to move relative to the fixed portion and includes a piezoelectric element. The piezoelectric element includes a piezoelectric unit, a guiding element, and a counterweight element. A first end of the guiding element is connected to the piezoelectric unit, and a second end is connected to the fixed portion. The counterweight element is connected to the piezoelectric unit. The fixed portion comprises a bottom that has a first through hole and a second through hole. The first through hole corresponds to the piezoelectric unit and the counterweight element, accommodates a part of the piezoelectric unit and the counterweight element. The second through hole corresponds to the guiding element, accommodates the second end of the guiding element.

18 Claims, 7 Drawing Sheets

OPTICAL ELEMENT DRIVING MECHANISM WITH PIEZOELECTRIC DRIVING ASSEMBLY

CROSS REFERENCE TO RELATED APPLICATIONS

This application claims the benefit of U.S. Provisional Application No. 63/268,573, filed Feb. 25, 2022, the entirety of which is incorporated by reference herein.

BACKGROUND OF THE INVENTION

Field of the Invention

The present disclosure relates to an optical element driving mechanism, and more particularly to an optical element driving mechanism that drives an optical assembly to rotate.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable that they have optical qualities that are better and more stable, offering consumers more choice.

Electronic devices that have image-capturing or video-recording functions normally include lenses or optical modules of fixed types. The fixed optical modules are limited by predetermined angles and cannot achieve image-capturing or video-recording functions with wider angles. As a result, the present disclosure provides an optical element driving mechanism that is different from the prior art, to improve image quality by broadening the range of receiving and/or emitting light with the device being fixed while achieving miniaturization of the mechanism.

BRIEF SUMMARY OF THE INVENTION

One embodiment according to the present disclosure provides an optical element driving mechanism, including a fixed portion, a movable portion, and a driving assembly. The movable portion is connected to an optical assembly. The driving assembly drives the movable portion to move relative to the fixed portion. The driving assembly includes a piezoelectric element.

In some embodiments, the piezoelectric element includes a piezoelectric unit, a guiding element, and a counterweight element. The first end of the guiding element is connected to the piezoelectric unit, and the second end is connected to the fixed portion. The counterweight element is connected to the piezoelectric unit, wherein the piezoelectric unit is disposed between the guiding element and the counterweight element.

In some embodiments, the fixed portion includes a bottom. The bottom has a first through hole and a second through hole. The first through hole corresponds to the piezoelectric unit and the counterweight element, accommodating a part of the piezoelectric unit and the counterweight element, and substantially having a rectangular profile. The second through hole corresponds to the guiding element, accommodating the second end of the guiding element, and substantially having a circular profile.

In some embodiments, the optical element driving mechanism further includes a plurality of adhesive elements disposed in the first through hole and the second through hole. The adhesive element in the first through hole connects the counterweight element and the fixed portion, and the adhesive element in the second through hole connects the guiding element and the fixed portion. The adhesive element is not in contact with the piezoelectric unit.

In some embodiments, the fixed portion further includes a cap corresponding to the bottom. The bottom includes a plurality of first attaching elements, and the cap includes a plurality of second attaching elements that correspond to the first attaching elements. The bottom is attached to the cap through the first attaching elements and the second attaching elements. The bottom includes two first slots disposed on opposite sides of the bottom, and the cap includes two second slots disposed on opposite sides of the cap that correspond to the first slots. Each of the first slots and each of the second slots forms a substantially circular opening. The openings correspond to two rotating shafts that are disposed on opposite sides of the movable portions. The rotating shafts are rotatably disposed inside the openings, whereby the movable portion is driven to rotate relative to the fixed portion by the driving assembly.

In some embodiments, each of the openings has a divergent portion. The divergent portions are closer to the outer side of the fixed portion than the movable portion. The divergent portions do not accommodate the rotating shafts of the movable portion.

In some embodiments, the fixed portion further includes a housing. The cap and the bottom are accommodated in the housing. The housing is made of metal materials. The housing covers the second through hole but not the first through hole.

In some embodiments, the housing includes two stopper elements corresponding to the rotating shafts of the movable portion. The stopper elements protrude inward from the outer side of the housing to the movable portion, but the stopper elements are not in contact with the movable portion.

In some embodiments, in the extending direction of the rotating shafts, there is a first distance between the stopper element and the rotating shaft, and there is a second distance between the movable portion and the cap of the fixed portion. The first distance is less than the second distance.

In some embodiments, each of the rotating shafts of the movable portion includes a metallic element disposed on the side that respectively faces the stopper element.

In some embodiments, the metallic elements are embedded in the rotating shafts.

In some embodiments, the optical element driving mechanism further includes a preload element connecting the movable portion and the fixed portion. In the bottom, a first recess is disposed above the first through hole, corresponding to the preload element, and a second recess is disposed at the movable portion, corresponding to the first recess. One end of the preload element is fixedly disposed in the first recess, and another end of the preload element is disposed in the second recess.

In some embodiments, the preload element and the piezoelectric unit at least partially overlap when viewed in the extending direction of the preload element.

In some embodiments, the first through hole is closer to the first recess than the second through hole.

In some embodiments, the driving assembly further includes a connecting component, a friction element, and a resilient element. The connecting component connects the movable portion and the piezoelectric element. The friction element is fixedly connected to the connecting component, and is disposed between the connecting component and the piezoelectric element. The resilient element is connected to the friction element, and is disposed between the connecting component and the friction element. The friction element provides a clamping force to affix the connecting component onto the piezoelectric element.

In some embodiments, the movable portion includes a holder and a sliding portion. The holder holds the optical assembly. The sliding portion is slidably connected to the connecting component of the driving assembly. The connecting component includes a clamping portion and a contact portion. The clamping portion includes a frame that surrounds the guiding element of the piezoelectric element, the friction element, and the resilient element. The contact portion is connected to the clamping portion, and has a first oblique surface and a second oblique surface. The first oblique surface corresponds to the holder of the movable portion, and the second oblique surface corresponds to the sliding portion of the movable portion.

In some embodiments, the optical element driving mechanism further includes a plurality of ball-shaped elements, movably disposed between the driving assembly and the fixed portion, and arranged in the extending direction of the guiding element of the driving assembly. The connecting component of the driving assembly further includes a plurality of cavities corresponding to the ball-shaped elements. The number of cavities is the same as the number of ball-shaped elements. The fixed portion further includes a third recess corresponding to the ball-shaped elements. The ball-shaped elements are disposed in the cavities of the connecting component and the third recess of the fixed portion.

In some embodiments, the optical element driving mechanism further includes a sensing assembly, including a magnetic element and a sensing element. The magnetic element is connected to the connecting component. The sensing element corresponds to the magnetic element, and is connected to the fixed portion. The magnetic element and the ball-shaped elements at least partially overlap when viewed in the extending direction of the guiding element of the driving assembly.

In some embodiments, the holder has a first surface, and the bottom has a second surface. The first surface is not perpendicular or parallel to the second surface.

In some embodiments, the optical assembly on the holder includes a circuit component. The circuit component extends away from the bottom. The extending direction of the circuit component is parallel to the first surface.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Figure 1:
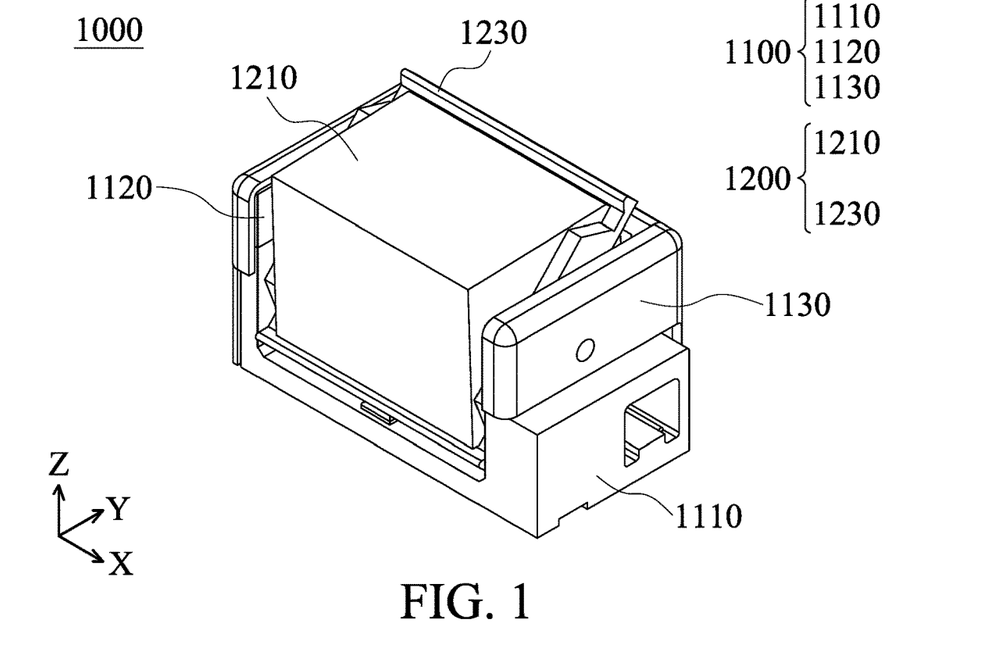
FIG. 1 is a perspective view of the optical element driving mechanism, according to some embodiments of the present disclosure.

Referring to FIG. 1, FIG. 1 is a perspective view of the optical element driving mechanism 1000, according to some embodiments of the present disclosure. As shown in FIG. 1, the optical element driving mechanism 1000 mainly includes a fixed portion 1100 and a movable portion 1200. In some embodiments, the fixed portion 1100 may include a bottom 1110, a cap 1120, and a housing 1130. The cap 1120 corresponds to the bottom 1110. The bottom 1110 and the cap 1120 are both accommodated in the housing 1130, which may be made of metal materials. The movable portion 1200 may include an optical assembly 1210 and a holder 1230. The holder 1230 holds the optical assembly 1210. In the embodiment shown in FIG. 1, the optical assembly 1210 is an optical prism, which has the functions of reflecting lights and changing the travelling direction of lights.

Figure 2:
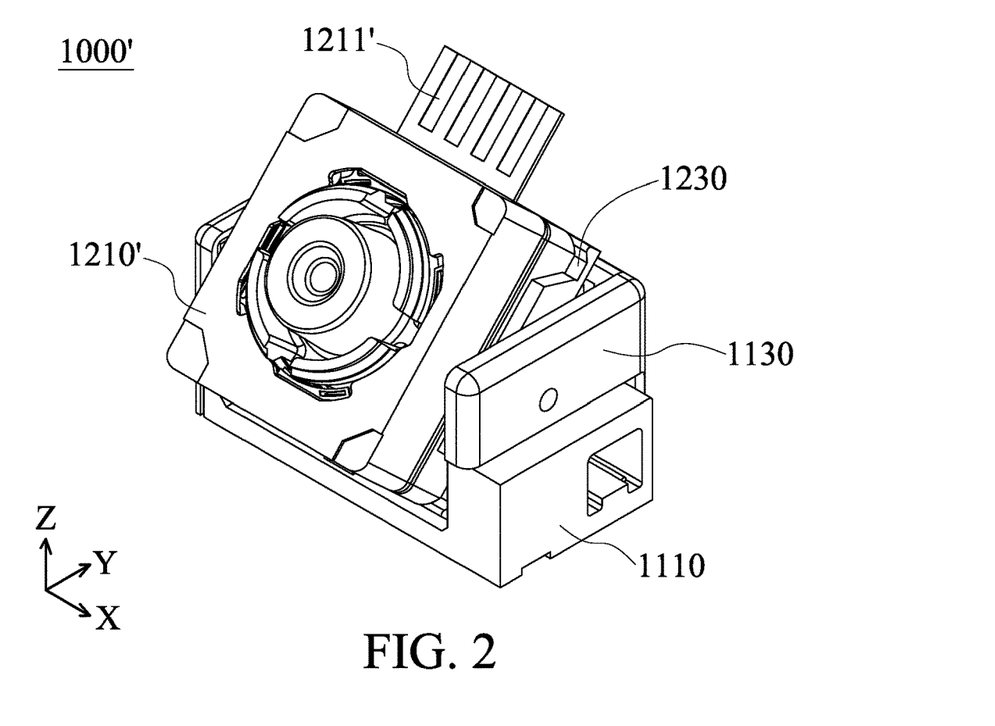
FIG. 2 is a perspective view of the optical element driving mechanism, according to other embodiments of the present disclosure.

FIG. 2 is a perspective view of the optical element driving mechanism 1000', according to other embodiments of the present disclosure. In other embodiments, the movable portion 1200 may be connected to an optical assembly 1210'. In the embodiment shown in FIG. 2, the optical assembly 1210' may be an optical lens module or a depth sensor, or the like. The optical assembly 1210' may be altered to meet user requirements. The optical assembly 1210' may include a circuit component 1211', which provides electrical connection between an external control system (not shown) and the optical assembly 1210'. In some embodiments, the circuit component 1211' extends away from the bottom 1110. The extending direction of the circuit component 1211' is parallel to the first surface 1231 of the holder 1230 (see FIG. 4A). As a result, the complexity of circuit layout may be reduced.

Figure 3:
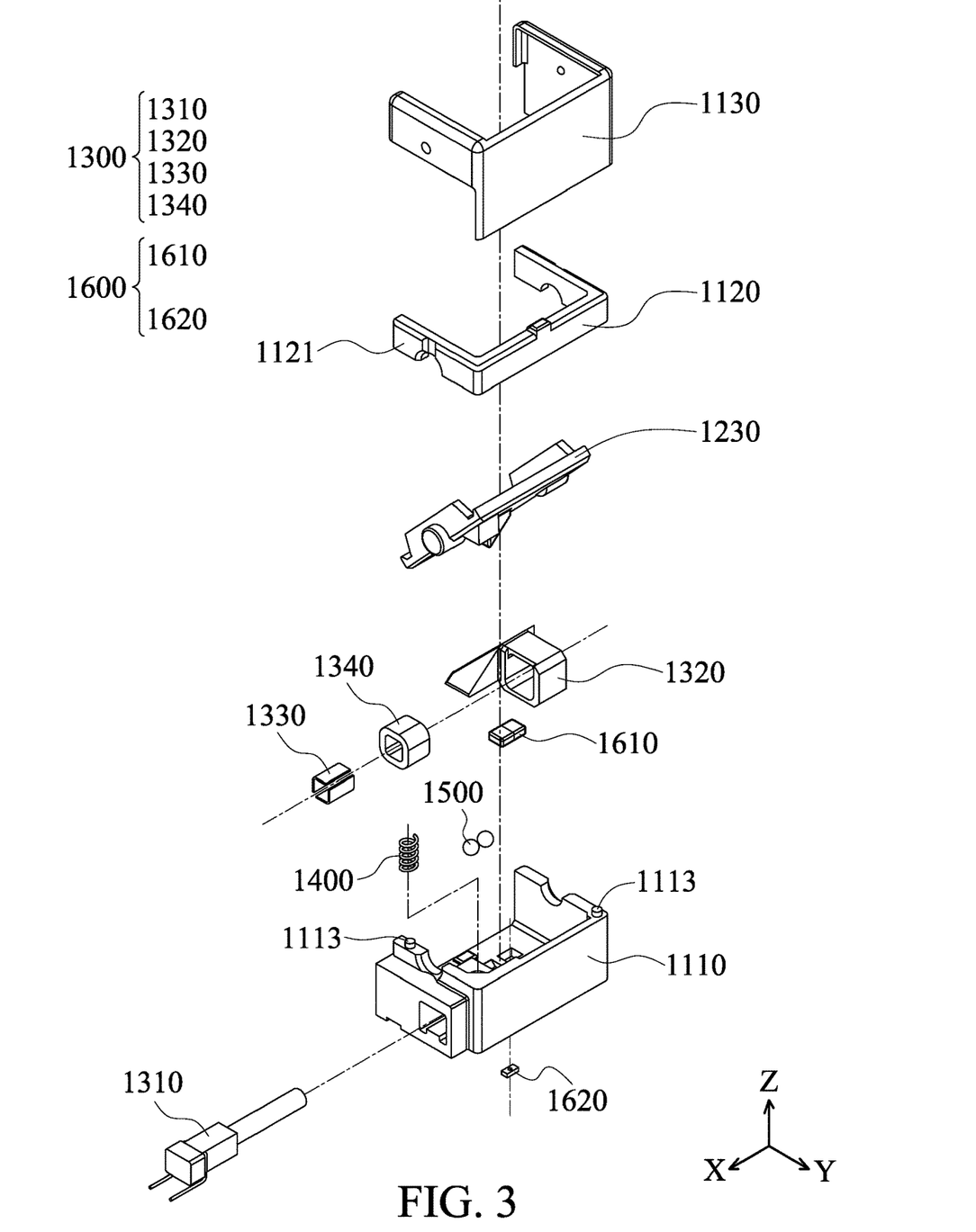
FIG. 3 is a exploded view of the optical element driving mechanism, according to some embodiments of the present disclosure, wherein the optical assembly is omitted.

FIG. 3 is a exploded view of the optical element driving mechanism 1000, according to some embodiments of the present disclosure, wherein the optical assembly 1210 (or the optical assembly 1210') is omitted. As can be seen in FIG. 3, the bottom 1110 may include a plurality of the first attaching elements 1113, and the cap 1120 may include a plurality of the second attaching elements 1121 that correspond to the first attaching elements 1113 (only one of the second attaching elements 1121 is shown in FIG. 3). In the embodiment shown in FIG. 3, the first attaching elements 1113 are protruding pillars that protrude from the upper surface of the bottom 1110, and the second attaching elements 1121 are recesses corresponding to the protruding pillars. The bottom 1110 and the cap 1120 may be positioned and attached together by fitting the first attaching elements 1113 and the second attaching elements 1121. Of course, in other embodiments, the first attaching elements 1113 may be recesses, and the second attaching elements 1121 may be protruding pillars.

As shown in FIG. 3, the optical element driving mechanism 1000 further includes a driving assembly 1300, a preload element 1400, a plurality of ball-shaped elements 1500, and a sensing assembly 1600. The driving assembly 1300 drives the movable portion 1200 to move relative to the fixed portion 1100. The driving assembly 1300 includes a piezoelectric element 1310, a connecting component 1320, a friction element 1330, and a resilient element 1340. The piezoelectric element 1310 provides the driving force for driving the movable portion 1200. The connecting component 1320 connects the movable portion 1200 with the piezoelectric element 1310. The connecting component 1320 is affixed onto the piezoelectric element 1310 through the friction element 1330 and the resilient element 1340, which is described in detail below with reference to FIG. 8.

The preload element 1400 is connected to the fixed portion 1100 and the movable portion 1200. In some embodiments, the preload element 1400 may be a spring, which provides an elastic restoring force. Through the elastic force of the preload element 1400, the movable portion 1200 may be ensured to be in constant contact with the driving assembly 1300, so that the driving force may be ensured to be transmitted to the movable portion 1200. The configuration of the preload element 1400 is described in detail below with reference to FIG. 7.

The ball-shaped elements 1500 are movably disposed between the driving assembly 1300 and the fixed portion 1100. More specifically, the ball-shaped elements 1500 are movable disposed between the connecting component 1320 and the bottom 1110. The connecting component 1320 may linearly slide in X direction relative to the bottom 1110 via the ball-shaped elements 1500. The configuration of the ball-shaped elements 1500 is described in detail below with reference to FIG. 11.

The sensing assembly 1600 includes a magnetic element 1610 and a sensing element 1620. The magnetic element 1610 is connected to the connecting component 1320. The sensing element 1620 corresponds to the magnetic element 1610, and is connected to the bottom 1110 of the fixed portion 1100. The sensing assembly 1600 is for sensing the position of the connecting component 1320 relative to the bottom 1110. The sensing assembly 1600 may be any suitable position sensing assembly, such as a Hall sensor, a Tunneling Magnetoresistance (TMR) effect sensor, a Giant Magnetoresistance (GMR) effect sensor, or any magnetic sensor. The configuration of the sensing assembly 1600 is described in detail below with reference to FIG. 11.

Figure 4A:
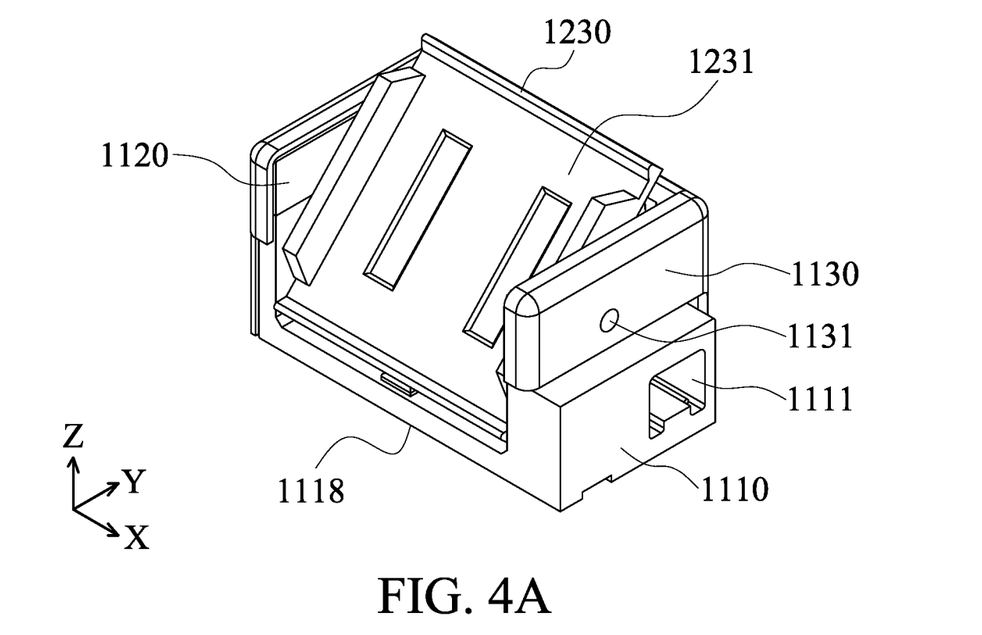
FIG. 4A and FIG. 4B are right side and left side perspective views of the optical element driving mechanism, respectively, according to some embodiments of the present disclosure, wherein the optical assembly is omitted.
Figure 4B:
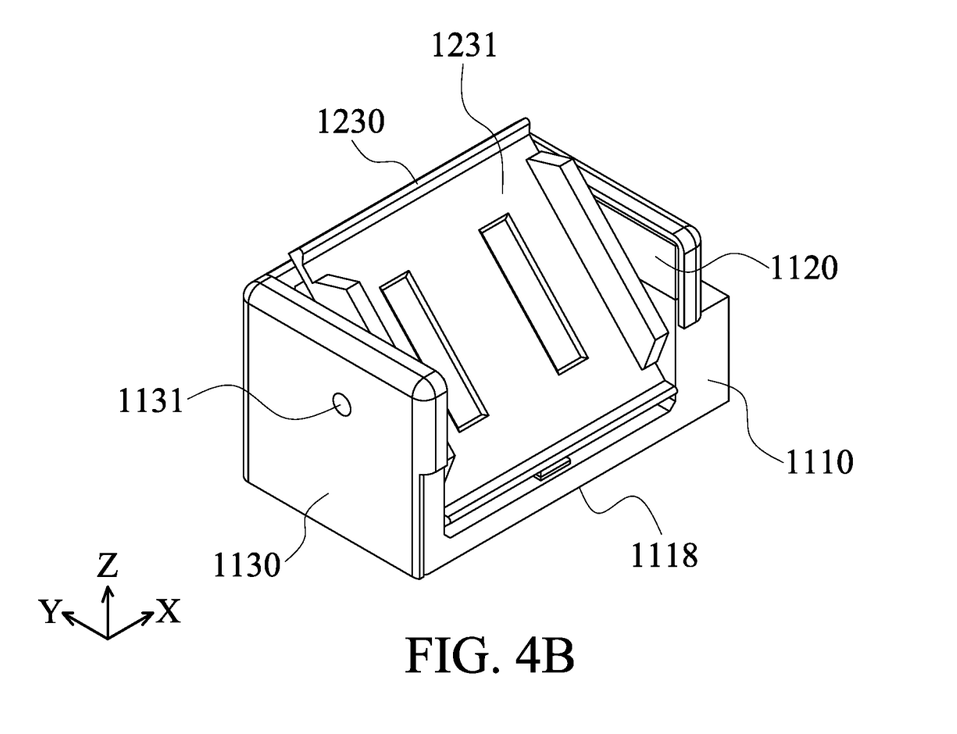
Figure 5A:
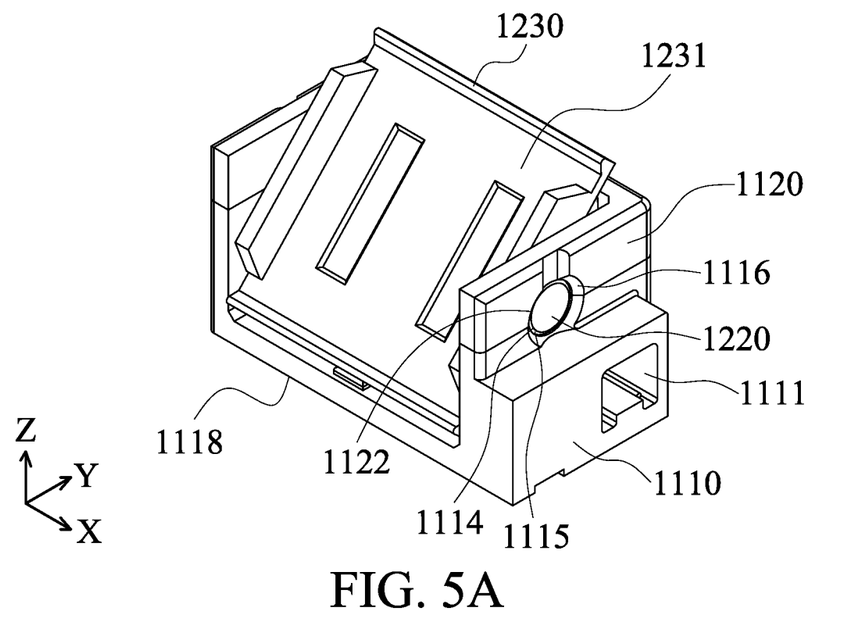
FIG. 5A and FIG. 5B are right side and left side perspective views of the optical element driving mechanism, respectively, according to some embodiments of the present disclosure, wherein the optical assembly and the housing are omitted.
Figure 5B:
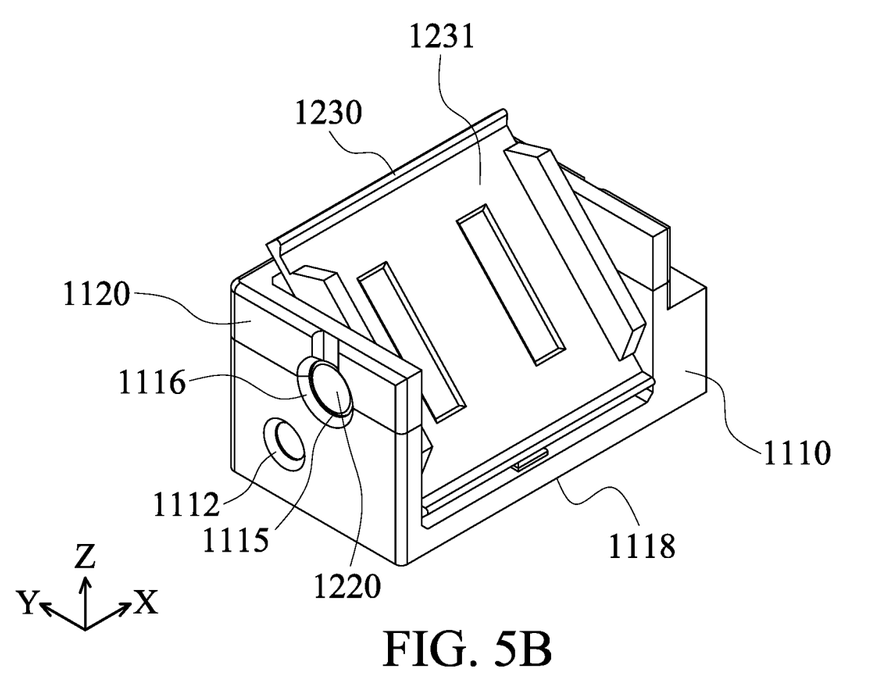

Referring to FIG. 4A, FIG. 4B, FIG. 5A, and FIG. 5B, FIG. 4A and FIG. 4B are right side and left side perspective views of the optical element driving mechanism 1000, respectively, according to some embodiments of the present disclosure, wherein the optical assemblies 1210 and 1210' are omitted. FIG. 5A and FIG. 5B are right side and left side perspective views of the optical element driving mechanism 1000, respectively, according to some embodiments of the present disclosure, wherein the optical assemblies 1210 and 1210' and the housing 1130 are omitted. As shown in the figures, the holder 1230 has a first surface 1231 that corresponds to the optical assembly 1210 or the optical assembly 1210' held thereon. The bottom 1110 has a second surface 1118, which is the bottom surface of the entire mechanism, and is parallel to XY plane. In some embodiments, the first surface 1231 is not perpendicular or parallel to the second surface 1118.

As can be seen in FIG. 5A and FIG. 5B, the bottom 1110 includes two semicircular first slots 1114, which are disposed on two opposite sides of the bottom 1110 (the two sides in X direction). The cap 1120 includes two semicircular second slots 1122, which are disposed on two opposite sides of the cap 1120 (the two sides in X direction), corresponding to the first slots 1114. Each of the first slots 1114 and each of the second slots 1122 respectively forms a substantially circular opening 1115. Each of the openings 1115 corresponds to one of the rotating shafts 1220 that are disposed on two opposite sides of the movable portion 1200, respectively. That is, the two openings 1115 and the two rotating shafts 1220 are also disposed on the two sides in X direction. The rotating shafts 1220 are rotatably disposed in the openings 1115. Thus, the movable portion 1200 may rotate around the rotating shafts 1220 relative to the fixed portion 1100 when the driving assembly 1300 drives the movable portion 1200 to move relative to the fixed portion 1100. In some embodiments, each of the openings 1115 has a divergent portion 1116. The divergent portion 1116 is closer to the outer side of the fixed portion 1100 than the movable portion 1200. The divergent portion 1116 does not accommodate the rotating shaft 1220 of the movable portion 1200. That is, the movable portion 1200 does not extend to the divergent portion 1116. In some embodiments, the rotating shaft 1220 of the movable portion 1200 may be integrally formed with the holder 1230 to improve structural strength. It should be appreciated that the configuration of placing the rotating shaft 1220 between the cap 1120 and the bottom 1110 is beneficial for simplifying the assembling process, and achieves miniaturization.

As can be seen in FIG. 4A and FIG. 4B, the housing 1130 may include two stopper elements 1131, corresponding to the rotating shafts 1220 of the movable portion 1200. The stopper elements 1131 protrude inward from the outer side of the housing 1130 to the movable portion 1200, but the stopper elements 1131 are not in contact with the movable portion 1200. The stopper element 1131 may be limiting elements for the movable portion 1200, which determine the terminal positions of the movable portion 1200 in X direction.

Figure 6:
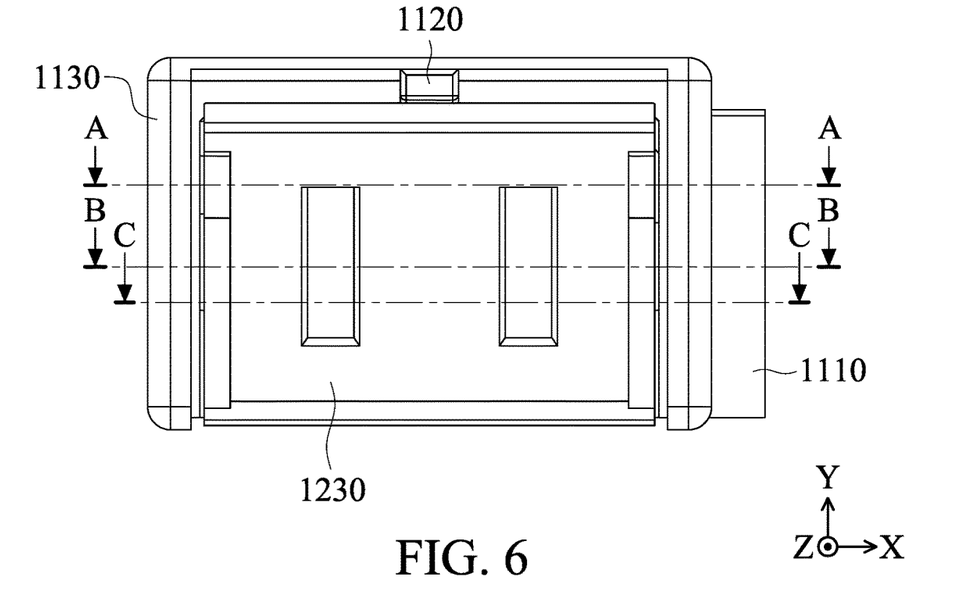
FIG. 6 is a top view of the optical element driving mechanism, according to some embodiments of the present disclosure, wherein the optical assembly is omitted.
Figure 10:
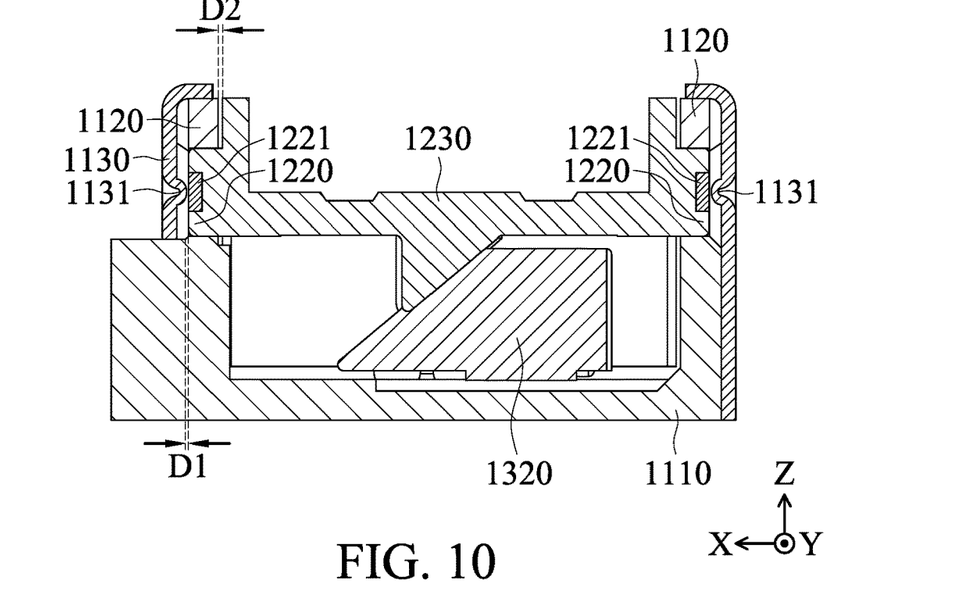
FIG. 10 is a sectional view of the optical element driving mechanism along line B-B in FIG. 6, according to some embodiments of the present disclosure.

Referring to FIG. 6 and FIG. 10, FIG. 6 is a top view of the optical element driving mechanism 1000, according to some embodiments of the present disclosure, wherein the optical assemblies 1210 and 1210' are omitted. FIG. 10 is a sectional view of the optical element driving mechanism 1000 along line B-B in FIG. 6, according to some embodiments of the present disclosure. The line B-B generally passes through the center of the openings 1115, so that FIG. 10 can clearly show the structures of the stopper elements 1131 and the rotating shafts 1220. As shown in FIG. 10, in the extending direction of the rotating shafts 1220 (X direction), there is a first distance D1 between the stopper element 1131 and the rotating shaft 1220, and there is a second distance D2 between the movable portion 1200 and the cap 1120 of the fixed portion 1100. In some embodiments, the first distance D1 is less than the second distance D2 to avoid the collision between the movable portion 1200 (especially the holder 1230) and the cap 1120 (which is connected to the bottom 1110 that the sensing assembly 1600 is disposed on), which causes unnecessary interference. In some embodiments where the holder 1230 (and thus the rotating shaft 1220) is made of plastic materials, each of the two rotating shafts 1220 may include a metallic element 1221 disposed on the side that faces the stopper element 1131. In the embodiment shown in FIG. 10, to achieve miniaturization, the metallic elements 1221 are embedded in the rotating shafts 1220, and only the surfaces that are close to the stopper elements 1131 are exposed. By disposing the metallic elements 1221, even if the rotating shafts 1220 and the stopper elements 1131 inadvertently collide in X direction, no plastic debris or dust would be generated due to abrasion, thereby preventing the optical quality and stability from being affected.

Figure 7:
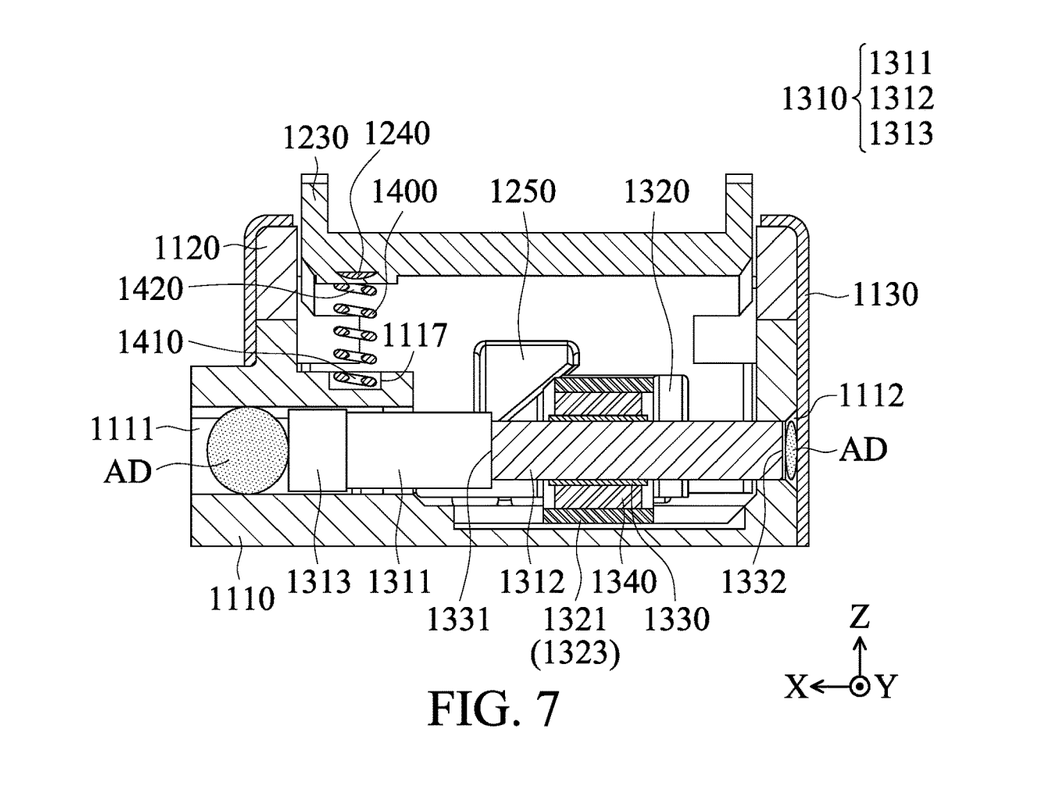
FIG. 7 is a sectional view of the optical element driving mechanism along line A-A in FIG. 6, according to some embodiments of the present disclosure.

Referring to FIG. 6 and FIG. 7, FIG. 7 is a sectional view of the optical element driving mechanism 1000 along line A-A in FIG. 6, according to some embodiments of the present disclosure. The line A-A generally passes through the center of the piezoelectric element 1310, so that FIG. 7 can clearly show the structures of the piezoelectric element 1310 and the bottom 1110. As shown in FIG. 7, the piezoelectric element 1310 may include a piezoelectric unit 1311, a guiding element 1312, and a counterweight element 1313 that are arranged along X direction. The guiding element 1312 extends in X direction. The guiding element 1312 has a first end 1331 and a second end 1332. The first end 1331 is connected to the piezoelectric unit 1311, and the second end 1332 is connected to the bottom 1110 of the fixed portion 1100. The counterweight element 1313 is connected to the piezoelectric unit 1311. The piezoelectric unit 1311 is disposed between the guiding element 1312 and the counterweight element 1313.

The bottom 1110 has a first through hole 1111 and a second through hole 1112. The first through hole 1111 corresponds to the piezoelectric unit 1311 and the counterweight element 1313. At least a part of the piezoelectric unit 1311 and the counterweight element 1313 are accommodated in the first through hole 1111. Corresponding to the contour of the piezoelectric unit 1311 and the counterweight element 1313, the first through hole 1111 substantially has a rectangular profile. The second through hole 1112 corresponds to the guiding element 1312. At least a part of the guiding element 1312 is accommodated in the second through hole 1112. Corresponding to the contour of the guiding element 1312, the second through hole 1112 substantially has a circular profile. In the embodiment shown in the present disclosure, the housing 1130 covers the second through hole 1112 but not the first through hole 1111. That is, a part of the bottom 1110 is exposed outside of the housing 1130. In addition, in some embodiments, adhesive elements AD may be disposed in the first through hole 1111 and/or the second through hole 1112. The adhesive element AD in the first through hole 1111 connects the counterweight element 1313 to the bottom 1110 of the fixed portion 1100. The adhesive element AD in the second through hole 1112 connects the guiding element 1312 to the bottom 1110. It should be noted that the adhesive element AD is not in contact with the piezoelectric unit 1311 to avoid interference. The adhesive elements AD illustrated in FIG. 7 are intended to show the position of the adhesive elements AD, and not intended to be limiting the sizes or shapes of the adhesive elements AD. The mechanical strength of the entire mechanism may be improved by disposing the adhesive elements AD.

In the bottom 1110, a first recess 1117 is disposed above (+Z direction) the first through hole 1111, corresponding to the preload element 1400. A second recess 1240 is disposed on the movable portion 1200, corresponding to the first recess 1117. The preload element 1400 has one end 1410 and another end 1420. The one end 1410 is fixedly disposed in the first recess 1117, and another end 1420 is fixedly disposed in the second recess 1240. As mentioned above, the preload element 1400 provides an elastic restoring force for the movable portion 1200, which is helpful for maintaining the driving efficiency. The preload element 1400 extends along Z direction. When viewed in the extending direction of the preload element 1400, the preload element 1400 and the piezoelectric element 1310 at least partially overlap. More specifically, when viewed in the extending direction of the preload element 1400, the preload element 1400 and the piezoelectric unit 1311 at least partially overlap. In addition, the first through hole 1111 is closer to the first recess 1117 than the second through hole 1112. In the embodiment shown in FIG. 7, the first recess 1117 is formed on one of the sidewalls that form the first through hole 1111.

Figure 8:
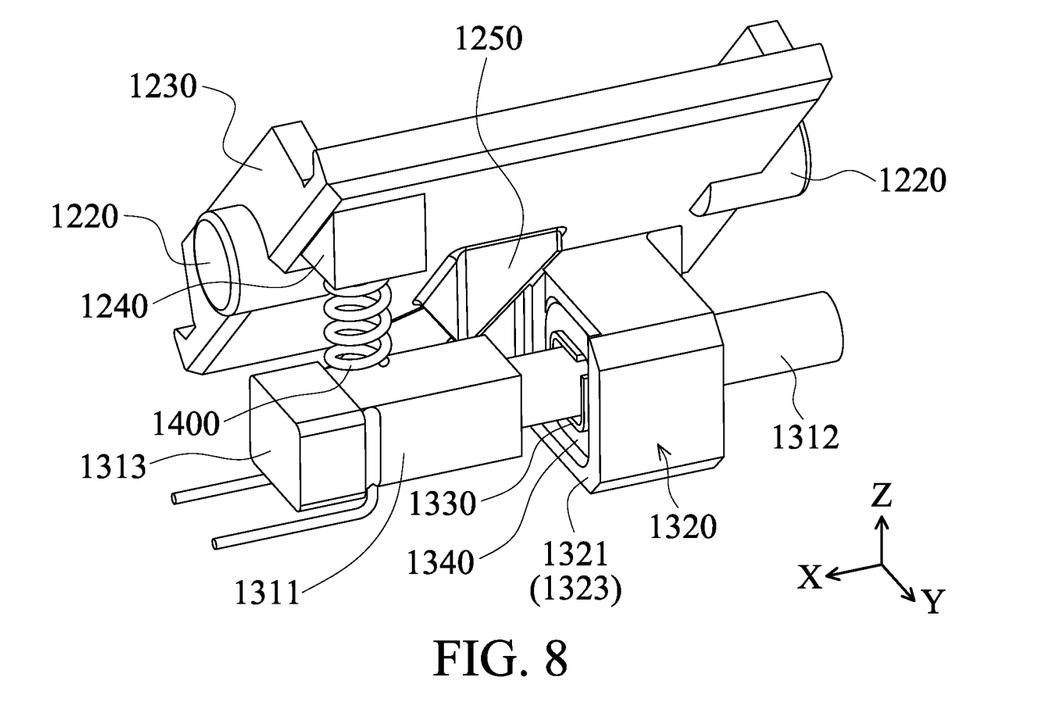
FIG. 8 is a schematic view showing the connection of the movable portion and the driving assembly, according to some embodiments of the present disclosure.
Figure 9:
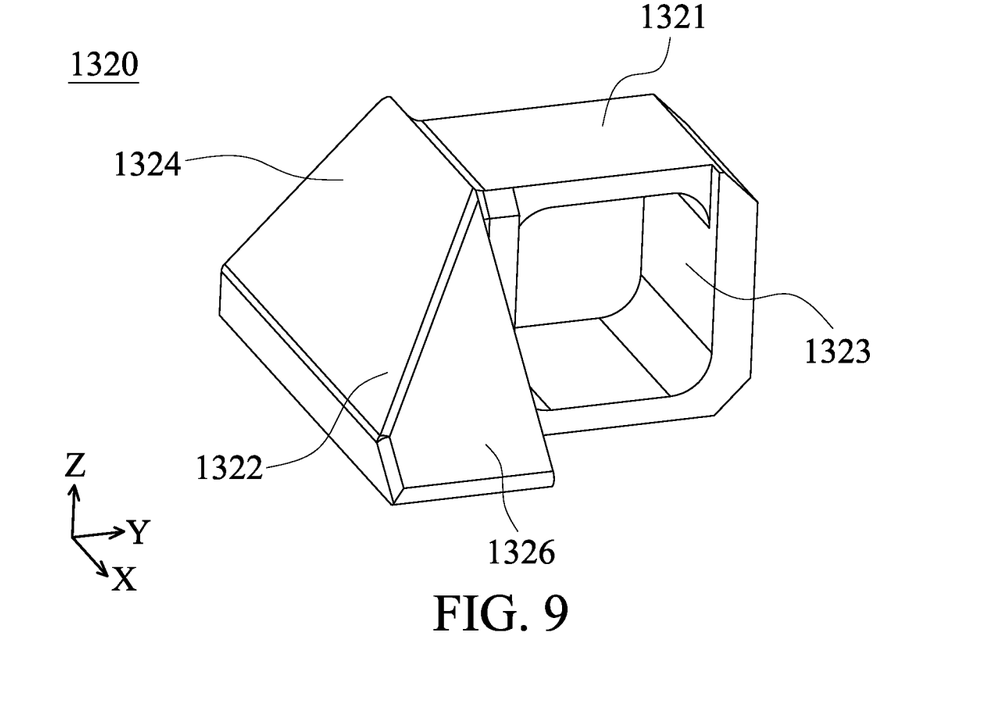
FIG. 9 is a perspective view of the connecting component, according to some embodiments of the present disclosure.

Referring to FIG. 7, FIG. 8, and FIG. 9, FIG. 8 is a schematic view showing the connection of the movable portion 1200 and the driving assembly 1300, according to some embodiments of the present disclosure. FIG. 9 is a perspective view of the connecting component 1320, according to some embodiments of the present disclosure. As shown in FIG. 7 and FIG. 8, the movable portion 1200 includes a sliding portion 1250. The sliding portion 1250 is slidably connected to the connecting component 1320 of the driving assembly 1300, and has an oblique surface that corresponds to the connecting component 1320. As shown in FIG. 9, the connecting component 1320 includes a clamping portion 1321 and a contact portion 1322. The clamping portion 1321 includes a frame 1323. The frame 1323 surrounds the guiding element 1312 of the piezoelectric element 1310, the friction element 1330, and the resilient element 1340. The contact portion 1322 is connected to the clamping portion 1321, and is located on the side that is closer to the movable portion 1200. The contact portion 1322 has a first oblique surface 1324 and a second oblique surface 1326. The first oblique surface 1324 corresponds to the holder 1230 of the movable portion 1200, and is parallel to the first surface 1231 of the holder 1230 (see FIG. 4A). The second oblique surface 1326 corresponds to the oblique surface of the sliding portion 1250 of the movable portion 1200. Through the sliding motion of the second oblique surface 1326 relative to the sliding portion 1250, the movable portion 1200 is driven to rotate relative to the fixed portion 1100.

As mentioned above, in the driving assembly 1300, the connecting component 1320 is affixed onto the piezoelectric element 1310 through the friction element 1330 and the resilient element 1340. More specifically, the connecting component 1320 is affixed onto the guiding element 1312 of the piezoelectric element 1310. As shown in the figures, the friction element 1330 is fixedly connected to the connecting component 1320 through the resilient element 1340, and is disposed between the connecting component 1320 and the piezoelectric element 1310. The resilient element 1340 is connected to the friction element 1330, and is disposed between the connecting component 1320 and the friction element 1330. The friction element 1330 provides a clamping force for affixing the connecting component 1320 onto the guiding element 1312 of the piezoelectric element 1310. In other words, the driving assembly 1300 secures the position of the connecting component 1320 (and thus the movable portion 1200) relative to the piezoelectric element 1310 by the friction element 1330 and the resilient element 1340. After the movable portion 1200 is moved to desired position and achieves the desired optical effects, the connecting component 1320 is secured by the friction element 1330 and the resilient element 1340 to prevent the position of the movable portion 1200 from being changed by external impact or shaking.

In some embodiments according to the present disclosure, the guiding element 1312 of the piezoelectric element 1310 is made of a carbon rod. The carbon rod may be used as the element that stretch and deform in the X direction. However, in other embodiments, the piezoelectric unit 1311 may include other suitable materials. In some embodiments according to the present disclosure, friction element 1330 of the piezoelectric element 1310 is made from multiple metal sheets (e.g. iron sheets). The metal sheets are used as the elements that clamp onto the guiding element 1312. However, in other embodiments, the friction element 1330 may include other suitable materials. In some embodiments according to the present disclosure, the resilient element 1340 of piezoelectric element 1310 is made of rubber. The rubber may be used as the element that further clamps onto guiding element 1312. However, in other embodiments, the resilient element 1340 may include other suitable materials.

Figure 11:
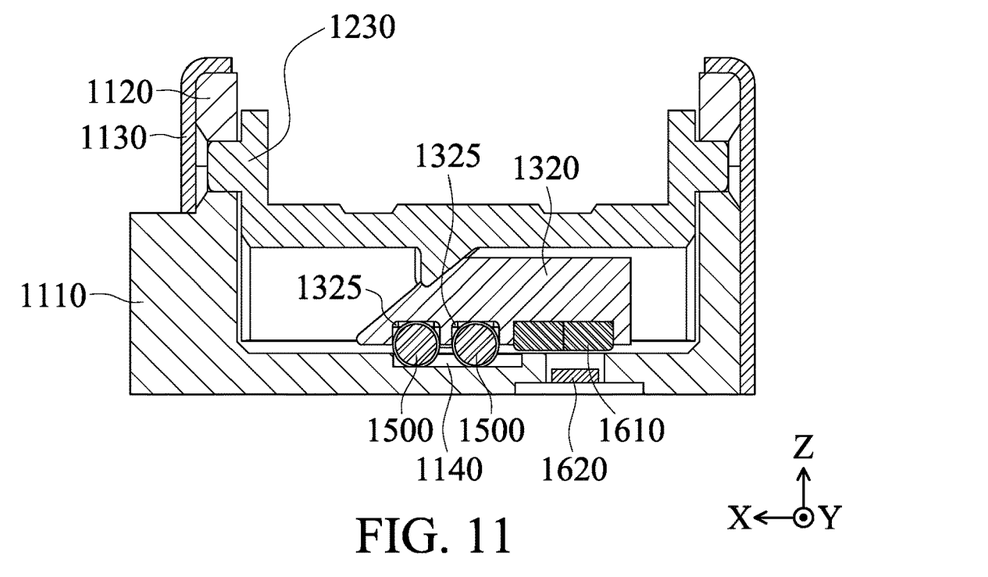
FIG. 11 is a sectional view of the optical element driving mechanism along line C-C in FIG. 6, according to some embodiments of the present disclosure.

Referring to FIG. 6 and FIG. 11, FIG. 11 is a sectional view of the optical element driving mechanism 1000 along line C-C in FIG. 6, according to some embodiments of the present disclosure. The line C-C generally passes through the center of the ball-shaped elements 1500, so that FIG. 11 can clearly show the structures of the ball-shaped elements 1500, the sensing assembly 1600, the connecting component 1320, and the bottom 1110. The embodiment shown in FIG. 11 includes two ball-shaped elements 1500 that are arranged in the extending direction of the guiding element 1312 of the driving assembly 1300 (i.e. X direction). The connecting component 1320 includes a plurality of cavities 1325 that correspond to the ball-shaped elements 1500. The number of cavities 1325 is the same as the number of ball-shaped elements 1500. Therefore, in the embodiment shown in FIG. 11, the connecting component 1320 includes two cavities 1325. The cavities 1325 limit the position of the ball-shaped elements 1500, so that the ball-shaped elements 1500 do not leave their moving path and impair the driving efficiency. The bottom 1110 of the fixed portion 1100 further includes a third recess 1140 that corresponds to the ball-shaped elements 1500. The third recess 1140 may be a long-shaped recess without partitions, which allows the ball-shaped elements 1500 to roll therein without leaving their moving path. That is, the ball-shaped elements 1500 are disposed in the cavities 1325 of the connecting component 1320 and the third recess 1140 of the fixed portion 1100. As mentioned above, the connecting component 1320 may linearly slide along X direction relative to the bottom 1110 through the ball-shaped elements 1500 that are movably disposed between the connecting component 1320 and the bottom 1110.

As shown in FIG. 11, in some embodiments, the magnetic element 1610 of the sensing assembly 1600 may partially embedded in the connecting component 1320, corresponding to the sensing element 1620 that is embedded in the bottom 1110. When viewed in X direction, the magnetic element 1610 and the ball-shaped elements 1500 at least partially overlap, which is beneficial for miniaturization.

In summary, the optical element driving mechanism 1000 (or the optical element driving mechanism 1000') provides a solution to transform the linear driving force of the driving assembly 1300 into a rotational movement of the optical assembly 1210 (or the optical assembly 1210'). As a result, in addition to the optical effects that can be achieved by the optical assemblies themselves, the optical element driving mechanism of the present disclosure can further broaden the range of receiving and/or emitting lights. This efficiently improves the image qualities. For example, by using the optical element driving mechanism 1000 of the present disclosure, the range of angles that the optical assembly 1210 may refract lights may be broadened. By using the optical element driving mechanism 1000' of the present disclosure, the optical assembly 1210' may be rotated to a desired location, then the optical assembly 1210' can perform optical functions such as focusing or zooming. Therefore, by using the optical element driving mechanism according to embodiments of the present disclosure, better optical qualities may be obtained while achieve miniaturization.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion connected to an optical assembly; and
a driving assembly driving the movable portion to move relative to the fixed portion;
wherein the driving assembly comprises a piezoelectric element;
wherein the piezoelectric element comprises:
a piezoelectric unit;
a guiding element, wherein a first end of the guiding element is connected to the piezoelectric unit, and a second end is connected to the fixed portion; and
a counterweight element connected to the piezoelectric unit, wherein the piezoelectric unit is disposed between the guiding element and the counterweight element;
wherein the fixed portion comprises a bottom, wherein the bottom has:
a first through hole, corresponding to the piezoelectric unit and the counterweight element, accommodating a part of the piezoelectric unit and the counterweight element, and substantially having a rectangular profile; and
a second through hole, corresponding to the guiding element, accommodating the second end of the guiding element, and substantially having a circular profile.

2. The optical element driving mechanism as claimed in claim 1, further comprising a plurality of adhesive elements disposed in the first through hole and the second through hole, wherein the adhesive element that is in the first through hole connects the counterweight element and the fixed portion, and the adhesive element that is in the second through hole connects the guiding element and the fixed portion, wherein the plurality of the adhesive elements are not in contact with the piezoelectric unit.

3. The optical element driving mechanism as claimed in claim 1, wherein the fixed portion further comprises a cap corresponding to the bottom;
wherein the bottom includes a plurality of first attaching elements, and the cap includes a plurality of second attaching elements that correspond to the plurality of the first attaching elements, and the bottom is attached to the cap through the plurality of the first attaching elements and the plurality of the second attaching elements;
wherein the bottom includes two first slots disposed on opposite sides of the bottom, and the cap includes two second slots disposed on opposite sides of the cap that correspond to the two first slots;
wherein each of the two first slots and each of the two second slots forms a substantially circular opening, the substantially circular openings correspond to two rotating shafts that are disposed on opposite sides of the movable portions, wherein the two rotating shafts are rotatably disposed inside the substantially circular openings, whereby the movable portion is driven to rotate relative to the fixed portion by the driving assembly.

4. The optical element driving mechanism as claimed in claim 3, wherein each of the substantially circular openings has a divergent portion, the divergent portions are closer to the outer side of the fixed portion than the movable portion, and the divergent portions do not accommodate the two rotating shafts of the movable portion.

5. The optical element driving mechanism as claimed in claim 4, wherein the fixed portion further comprises a housing, wherein the cap and the bottom are accommodated in the housing, and the housing is made of metal materials, and the housing covers the second through hole but not the first through hole.

6. The optical element driving mechanism as claimed in claim 5, wherein the housing includes two stopper elements corresponding to the two rotating shafts of the movable portion, the two stopper elements protrude inward from the outer side of the housing to the movable portion, but the two stopper elements are not in contact with the movable portion.

7. The optical element driving mechanism as claimed in claim 6, wherein in the extending direction of the two rotating shafts, there is a first distance between each of the two stopper elements and each of the two rotating shafts, and there is a second distance between the movable portion and the cap of the fixed portion, wherein the first distance is less than the second distance.

8. The optical element driving mechanism as claimed in claim 6, wherein each of the two rotating shafts of the movable portion includes a metallic element disposed on the side that respectively faces each of the two stopper elements.

9. The optical element driving mechanism as claimed in claim 8, wherein the metallic elements are embedded in the two rotating shafts.

10. The optical element driving mechanism as claimed in claim 1, further comprising a preload element connecting the movable portion and the fixed portion;
wherein in the bottom, a first recess is disposed above the first through hole, corresponding to the preload element, and a second recess is disposed at the movable portion, corresponding to the first recess, wherein one end of the preload element is fixedly disposed in the first recess, and another end of the preload element is disposed in the second recess.

11. The optical element driving mechanism as claimed in claim 10, wherein the preload element and the piezoelectric unit at least partially overlap when viewed in the extending direction of the preload element.

12. The optical element driving mechanism as claimed in claim 10, wherein the first through hole is closer to the first recess than the second through hole.

13. The optical element driving mechanism as claimed in claim 1, wherein the driving assembly further comprises:
a connecting component, connecting the movable portion and the piezoelectric element;
a friction element, fixedly connected to the connecting component, and disposed between the connecting component and the piezoelectric element; and
a resilient element, connected to the friction element, and disposed between the connecting component and the friction element;
wherein the friction element provides a clamping force to affix the connecting component onto the piezoelectric element.

14. The optical element driving mechanism as claimed in claim 13, wherein:
the movable portion comprises:
a holder holding the optical assembly; and a sliding portion slidably connected to the connecting component of the driving assembly;
and wherein the connecting component comprises:
a clamping portion, including a frame that surrounds the guiding element of the piezoelectric element, the friction element, and the resilient element; and
a contact portion, connected to the clamping portion, and having a first oblique surface and a second oblique surface, wherein the first oblique surface corresponds to the holder of the movable portion, and the second oblique surface corresponds to the sliding portion of the movable portion.

15. The optical element driving mechanism as claimed in claim 14, further comprising a plurality of ball-shaped elements, movably disposed between the driving assembly and the fixed portion, and arranged in the extending direction of the guiding element of the driving assembly;
wherein the connecting component of the driving assembly further includes a plurality of cavities corresponding to the plurality of the ball-shaped elements, wherein the number of the plurality of the cavities is the same as the number of the plurality of the ball-shaped elements;
wherein the fixed portion further includes a third recess corresponding to the plurality of the ball-shaped elements;
wherein the plurality of the ball-shaped elements are disposed in the plurality of the cavities of the connecting component and the third recess of the fixed portion.

16. The optical element driving mechanism as claimed in claim 15, further comprising a sensing assembly, comprising:
a magnetic element connected to the connecting component; and
a sensing element, corresponding to the magnetic element, and connected to the fixed portion;
wherein the magnetic element and the plurality of the ball-shaped elements at least partially overlap when viewed in the extending direction of the guiding element of the driving assembly.

17. The optical element driving mechanism as claimed in claim 14, wherein the holder has a first surface, and the bottom has a second surface, wherein the first surface is not perpendicular or parallel to the second surface.

18. The optical element driving mechanism as claimed in claim 17, wherein the optical assembly on the holder includes a circuit component, wherein the circuit component extends away from the bottom, and the extending direction of the circuit component is parallel to the first surface.

* * * * *